(12) United States Patent
McAfee et al.

(10) Patent No.: US 7,149,907 B2
(45) Date of Patent: Dec. 12, 2006

(54) MULTI-PROCESSOR SYSTEM RECOVERY USING THERMTRIP SIGNAL

(75) Inventors: Martin McAfee, Austin, TX (US); Kevin L. Miller, Austin, TX (US); Robert L. Nance, Georgetown, TX (US); Robert S. Tung, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 512 days.

(21) Appl. No.: 10/616,835

(22) Filed: Jul. 10, 2003

(65) Prior Publication Data
US 2005/0010827 A1 Jan. 13, 2005

(51) Int. Cl.
*G06F 1/26* (2006.01)
(52) U.S. Cl. ............... 713/300; 713/310; 713/323; 713/324; 714/2; 714/23; 714/48
(58) Field of Classification Search ........... 713/300, 713/310, 323, 324; 714/2, 23, 48
See application file for complete search history.

(56) References Cited

U.S. PATENT DOCUMENTS

| | | | |
|---|---|---|---|
| 5,627,962 A * | 5/1997 | Goodrum et al. ............ 714/13 |
| 5,737,615 A * | 4/1998 | Tetrick ............... 713/324 |
| 6,191,499 B1 * | 2/2001 | Severson et al. ........... 307/31 |
| 6,195,717 B1 | 2/2001 | Henderson et al. ......... 710/101 |
| 6,496,346 B1 | 12/2002 | Bruckner .................. 361/103 |
| 6,496,881 B1 * | 12/2002 | Green et al. ................ 710/58 |
| 6,535,944 B1 * | 3/2003 | Johari et al. .............. 710/302 |
| 6,601,165 B1 * | 7/2003 | Morrison et al. ............. 713/2 |
| 6,792,553 B1 * | 9/2004 | Mar et al. ................ 713/330 |
| 6,829,128 B1 * | 12/2004 | Gower et al. ............. 361/103 |
| 6,836,849 B1 * | 12/2004 | Brock et al. .............. 713/310 |
| 2002/0046365 A1 | 4/2002 | Avizienis .................. 714/43 |
| 2002/0087907 A1 * | 7/2002 | Poisner .................... 713/340 |
| 2003/0070104 A1 | 4/2003 | Bruckner et al. .......... 713/320 |

* cited by examiner

*Primary Examiner*—Lynne H. Browne
*Assistant Examiner*—Nitin C. Patel
(74) *Attorney, Agent, or Firm*—Baker Botts L.L.P.

(57) ABSTRACT

A method of responding to a thermal trip signal generated by a processor of a system having multiple processor nodes. If a processor overheats beyond a critical temperature, a temperature monitor receives the thermal trip signal, and turns off an enable signal to a voltage control module that control power to the processors. The temperature monitor also triggers a system reset. Upon reset, the temperature monitor ensures that all nodes, other than the node with the overheated processor, return to an operational state.

20 Claims, 3 Drawing Sheets

MULTI-PROCESSOR SYSTEM RECOVERY USING THERMTRIP SIGNAL

TECHNICAL FIELD

This invention relates to processing systems, and more particularly to heat monitoring for processing systems with multiple processing nodes.

BACKGROUND

Most of today's processors incorporate a temperature sensor used for thermal monitoring. Often, the thermal monitor is integrated into the processor silicon. It includes a temperature sensing circuit and means for generating a signal (PROCHOT) that indicates that the processor has reached a maximum safe operating temperature. The processor may also include control circuitry that can automatically reduce processor speed and thereby reduce power consumption while the processor temperature is high.

In addition to the PROCHOT signal, or perhaps, alternatively, processors may also include an on-die diode that monitors the die temperature (junction temperature). If the temperature rises above a predetermined threshold, the processor shuts down. More specifically, when the junction temperature rises above a certain temperature (i.e., 135° C. for the Pentium III processor), the processor stops executing all instructions. The processor signals this condition to the rest of the system with a THERMTRIP (thermal trip) signal. The processor will remain stopped until a reset signal goes active via a restart or reset switch.

SUMMARY

In accordance with teachings of the present disclosure, a system and method are described for responding to a thermal trip signal from a processor of a multi-node system. A temperature monitor is connected to receive a thermal trip signal from each processor. The temperature module is also connected to deliver an enable signal to a voltage control module associated with each node. The voltage control module is operable to deliver voltage to all processors of the node when the enable signal is on and to shut off power to all processors of the node when the enable signal is off.

If a processor becomes overheated and asserts a thermal trip signal, the temperature monitor receives the thermal trip signal, turns off the enable signal to voltage control module of the node containing the overheated processor, and delivers a system power signal to the chipset of the computing system. The system is then reset, such that all nodes other than the node containing the overheated processor regain power.

An advantage of the invention is that after a thermal trip signal from any one processor, the system may become operational even if the overheated processor remains overheated or otherwise inoperable. After a reset, the node with the overheated processor remains shut down as a result of the thermal trip signal, but the remaining nodes are in operation. The overall result is increased availability of the system, which is very important for systems such as high end servers.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
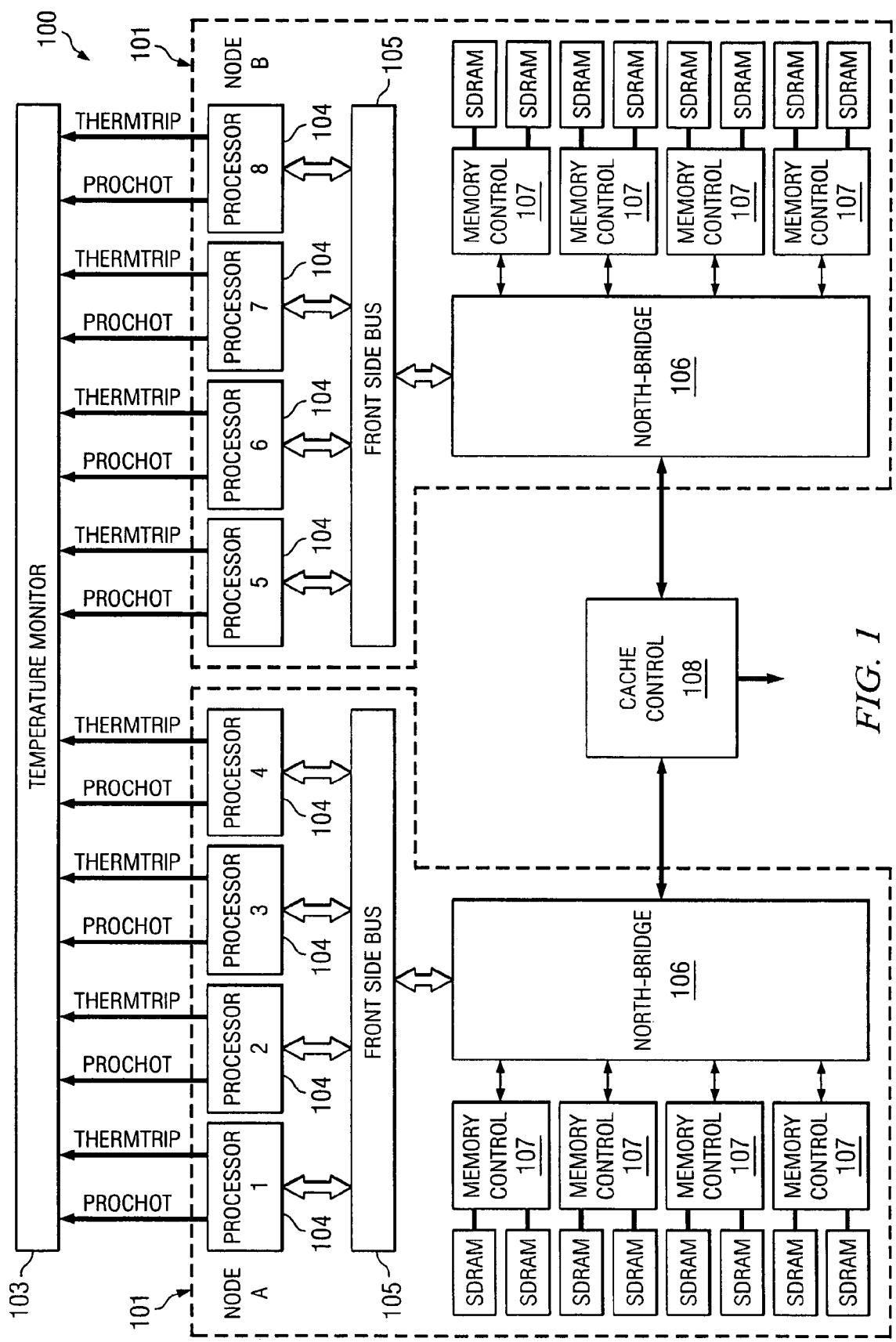
FIG. 1 illustrates a multiple processor system having a temperature monitor in accordance with the invention.

FIG. 1 illustrates a server system 100 having two nodes 101 (Node A and Node B) and a temperature monitor 103 in accordance with the invention. By "server system" is meant a computing system on a network that manages network resources.

Although the following description is in terms of monitoring processors of a server system, the same concepts could be applied to any "information handling system" having multiple processing nodes, each node having one or more processors. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Each node 101 has four processors (CPUs) 104. The number of processors is for purposes of example; a node 101 could have a single processor or some greater number of processors.

Each processor 104 may have the structure and function of conventional processors currently in use or of those to be developed. Input and output signals relevant to this description are shown; of course, a typical processor has many other input and output signals.

One output from each processor 104 is a THERMTRIP signal. A THERMTRIP signal from any processor indicates that the processor has overheated above a predetermined temperature. As explained below in connection with FIGS. 2 and 3, THERMTRIP signal from any overheated processor 104 results in a reset of system 100. Upon reset, the system 100 is operational except for the node 101 associated with the overheated processor 104.

The THERMTRIP signal is often associated with the family of processors manufactured by Intel Corporation. However, it should be understood that any "thermal trip" signal from a processor indicating an overheating condition would be equivalent to the THERMTRIP signal.

A second output from each processor 104 is a PROCHOT signal. As described in the background, the PROCHOT signal may cause an affected processor 104 to reduce its processing speed if its temperature reaches a certain level.

A THERMTRIP signal and a PROCHOT signal from each processor 104 are delivered to temperature monitor 103. Temperature monitor 103 comprises logic circuitry (hardware, firmware, or instruction-based processing) that implements the functional aspects of temperature monitor 103, described below. Temperature monitor may be implemented as a programmable logic device.

The remaining elements of system 100 are typical of a server system. Each processor 104 is connected via a front side bus 105 to a Northbridge 106, which provides the interface to memory elements 107. A cache controller 108 handles caching operations.

Figure 2:
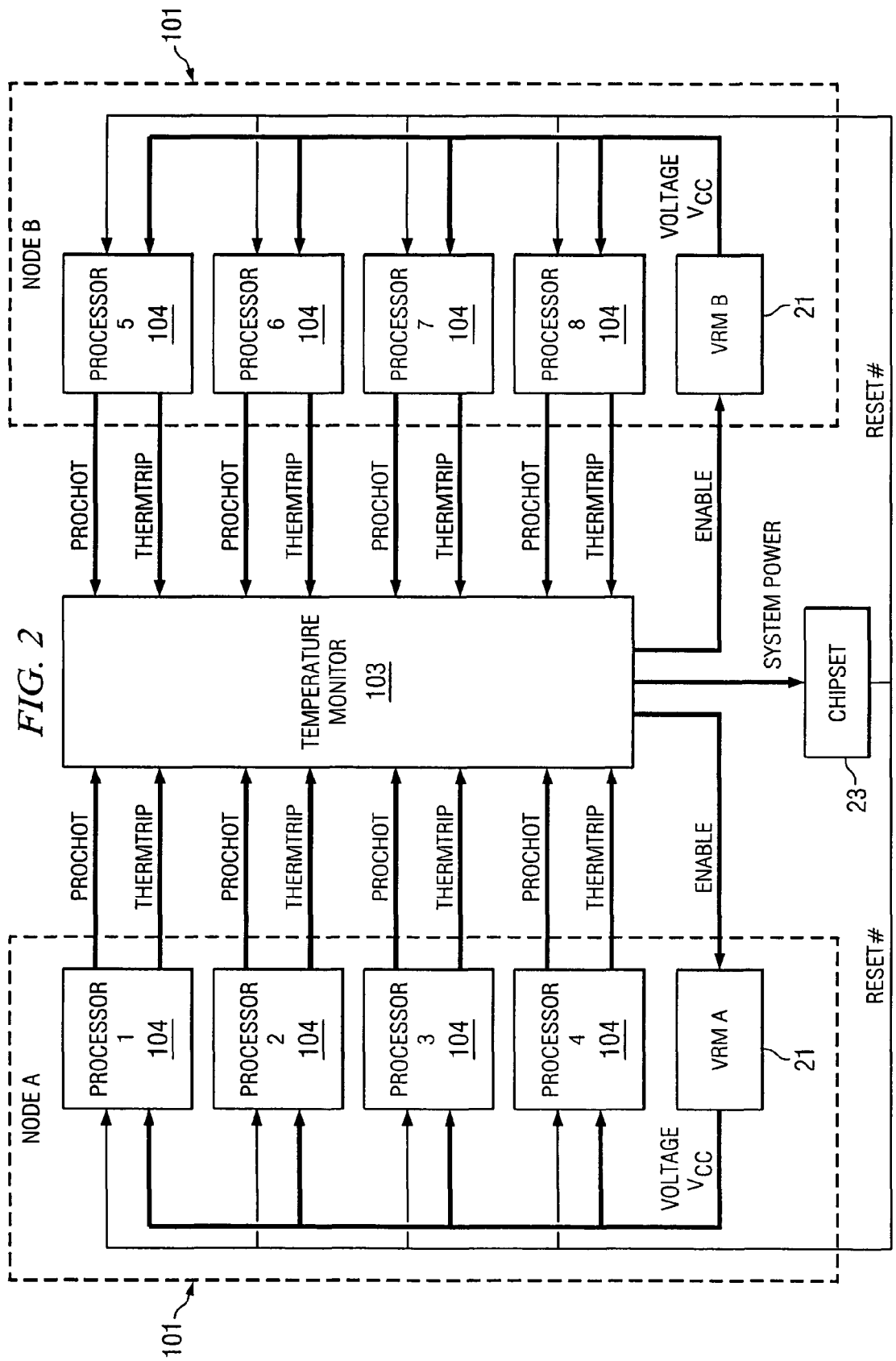
FIG. 2 further illustrates the temperature monitor of FIG. 1.

FIG. 2 illustrates temperature monitor 103 and its interconnections. Nodes 101 are the same as those illustrated in FIG. 1, each node 101 having four processors 104. The THERMTRIP and PROCHOT signal connections between processors 104 and temperature monitor 103 are direct wired connections.

Each node 101 has an associated voltage control module 21, connected between a power supply (not shown) and the power input to the processor 104. In the example of this description, voltage control modules 21 are referred to as voltage regulator modules (VRM A and VRM B), but any voltage control circuitry capable of receiving an enable signal to control the voltage supplied to processors 104 is adequate for purposes of the invention. Like conventional voltage regulator modules, each module 21 is operable to regulate the voltage supplied to the processors 104 of its associated node 101 (Node A or Node B).

An enable signal is delivered from temperature monitor 103 to each voltage control module 21, and determines whether or not the module 21 delivers voltage to its processors.

Temperature monitor 103 also delivers a system power signal to system control chipset 23. This system power signal permits temperature monitor 103 to report any power shut down (such as a shut down resulting from a THERMTRIP signal) to chipset 23.

Chipset 23 may be the same as Northbridge 106 of FIG. 1, but may also be whatever "system control unit" system 100 uses to generate a reset signal. In addition to generating a reset signal, chipset 23 may use the report from monitor 103 in any additional desired manner, such as by displaying or otherwise communicating the shut down and data about the shutdown (such as date, time, and processor identification) to an operator. Chipset 23 may also have any of the other functions associated with chipsets typical of server systems.

Figure 3:
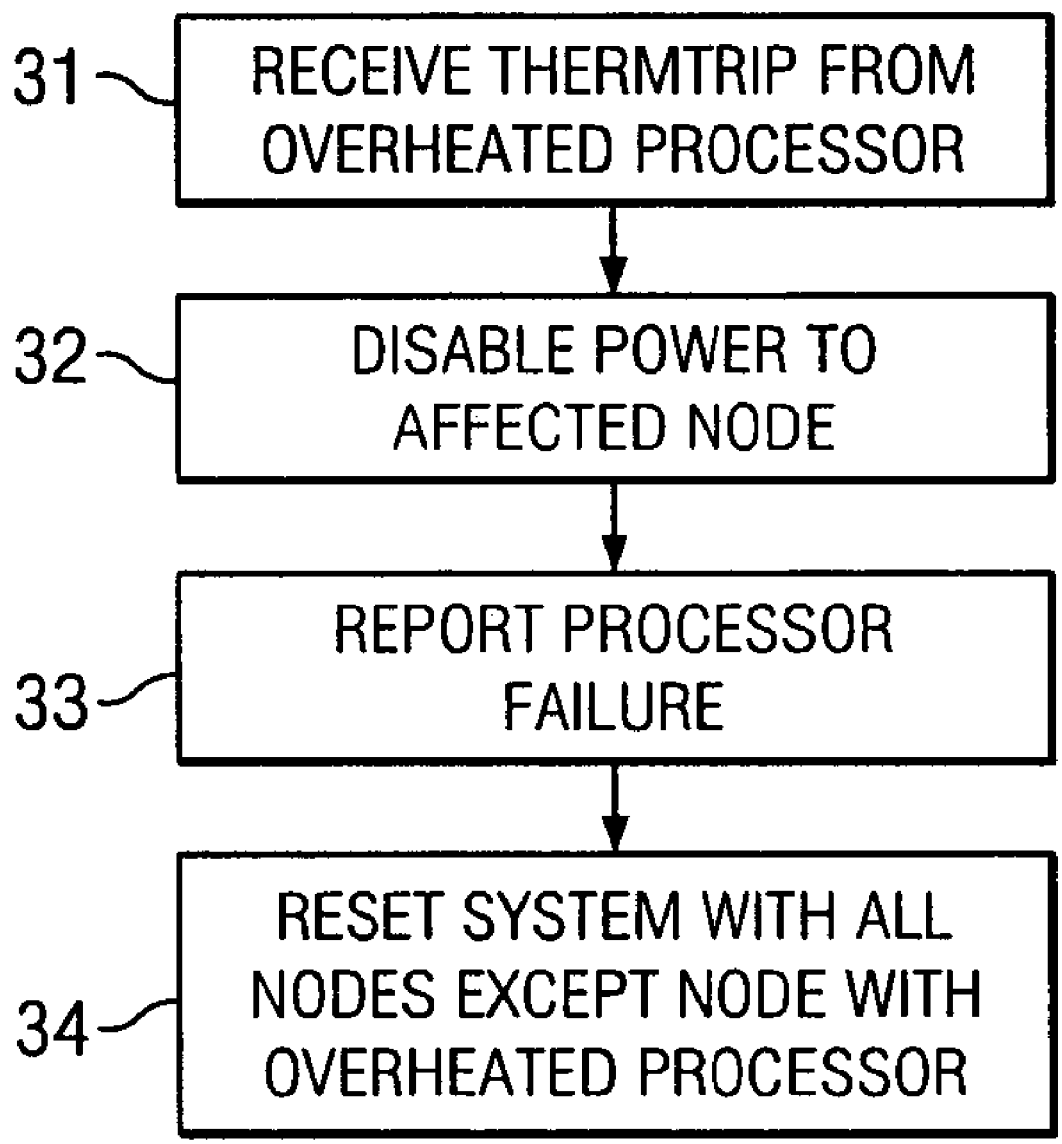
FIG. 3 illustrates a method of responding to a THERMTRIP signal in accordance with the invention.

FIG. 3 illustrates a method of using a THERMTRIP signal during run time of a multi-node server system 100, when one or more of its processors 104 overheats and asserts a THERMTRIP signal. Steps 31–33 of the method are implemented by the logic circuitry of temperature monitor 103. Step 34 is performed by the chipset 34, triggered by the system power signal delivered from temperature monitor 103.

In Step 31, temperature monitor 103 receives the THERMTRIP signal from the overheated processor 104. In Step 32, temperature monitor 103 responds to a THERMOTRIP signal by turning off the enable signal to the voltage control module 21 associated with the node 101 of the overheated processor 104. The enable signal remains in this off state regardless of the automatic resetting in Step 34.

In Step 33, temperature monitor 103 reports the overheated event to chipset 23, using the system power signal. This report triggers a reset signal from chipset 23 to all processors 104. The reporting signal may include an identification of which node and/or processor 104 delivered the THERMTRIP signal, and may further include data such as the date, time, and temperature during the processor failure.

In Step 34, chipset 23 responds to the report by delivering a reset signal to processors 104. As a result of the reset signal, all processors 104 are restarted in the node 101 that did not contain the overheated processor. Because its power is not enabled, the node 101 with the overheated processor remains shut down until manually restarted by a technician or other operator.

Although the disclosed embodiments have been described in detail, it should be understood that various changes, substitutions and alterations can be made to the embodiments without departing from their spirit and scope.

What is claimed is:

1. A method of responding to a thermal trip signal from a processor in a computing system having multiple nodes, each node having one or more processors, comprising the steps of:
    connecting a temperature monitor such that it may receive a thermal trip signal from each processor;
    connecting a voltage control module to each node, the voltage control module operable to deliver voltage to all processors of the associated node when an enable signal is on and to shut off power to all processors of the node when the enable signal is off;
    using the temperature monitor to: receive a thermal trip signal from an overheated processor; turn off the enable signal to the voltage control module of the node containing the overheated processor, such that the enable signal remains off during a system reset; and deliver a system power signal to a system reset controller; and
    resetting the system, such that all nodes other than the node containing the overheated processor regain power.

2. The method of claim 1, wherein the temperature monitor is a programmable logic device.

3. The method of claim 1, wherein the thermal trip signal is a THERMTRIP signal.

4. The method of claim 1, wherein the resetting step is performed by a system control unit.

5. The method of claim 1, wherein the delivering step identifies the overheated processor.

6. The method of claim 1, wherein the resetting step is performed automatically in response to the system power signal.

7. A temperature monitor for a computing system having multiple nodes, each node having one or more processors, and the computing system further responsive to a reset signal, the temperature monitor comprising:
    logic circuitry operable to turn on or off an enable signal that determines whether all processors of a node receive power;
    wherein the logic circuitry is further operable to receive a thermal trip signal from an overheated processor, to turn off the enable signal associated with the node containing the overheated processor, such that the enable signal remains off during a system reset, and to trigger a reset of the computing system.

8. The temperature monitor of claim 7, wherein the temperature monitor is implemented with a programmable logic device.

9. The temperature monitor of claim 7, wherein the temperature monitor turns on or off the enable signal via a connection to a voltage control module.

10. The temperature monitor of claim 7, wherein the temperature monitor triggers the reset by delivering a signal to a system control unit.

11. The temperature monitor of claim 7, wherein the temperature monitor is further operable to deliver a signal identifying the overheated processor.

12. The temperature monitor of claim 7, wherein the temperature monitor is further operable to deliver a signal identifying the node of the overheated processor.

13. The temperature monitor of claim 7, wherein the temperature monitor is further operable to respond to a PROCHOT signal.

14. An improved information handling system having multiple nodes, each node having one or more processors, and the computing system further responsive to a reset signal, the improvement comprising:
   a temperature monitor operable to turn on or off an enable signal that determines whether all processors of a node receive power;
   wherein the temperature monitor is further operable to receive a thermal trip signal from an overheated processor, to turn off the enable signal associated with the node containing the overheated processor, such that the enable signal remains off during a system reset, and to trigger a reset of the computing system.

15. The system of claim 14, wherein the temperature monitor is implemented with logic circuitry.

16. The system of claim 14, wherein the temperature monitor is implemented with a programmable logic device.

17. The system of claim 7, wherein the system has a voltage control module and the temperature monitor turns on or off the enable signal via a connection to the voltage control module.

18. The system of claim 14, wherein the temperature monitor triggers the reset by delivering a signal to a system control unit.

19. The system of claim 14, wherein the temperature monitor is further operable to deliver a signal identifying the overheated processor.

20. The system of claim 14, wherein the temperature module is further operable to respond to a PROCHOT signal.

* * * * *